RICKER & LEWIS.
Corn Sheller.
No. 49,303.
Patented Aug. 8, 1865.
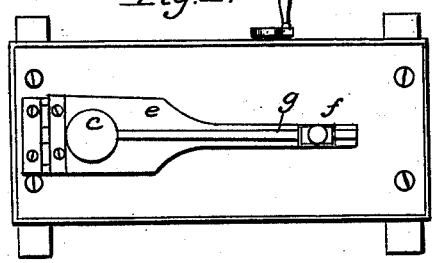
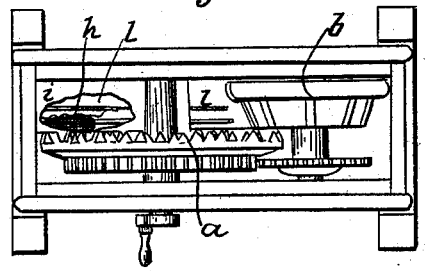
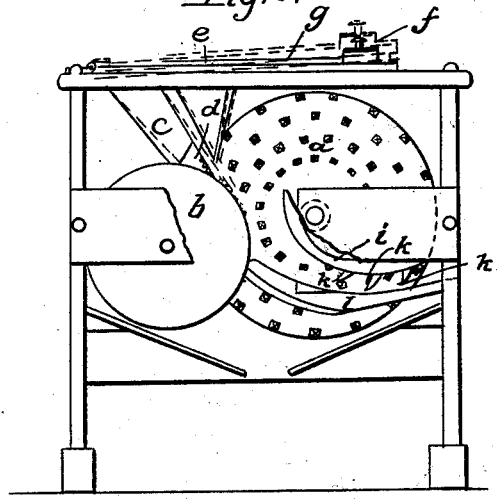

UNITED STATES PATENT OFFICE.

J. W. RICKER AND T. S. LEWIS, OF CHELSEA, MASSACHUSETTS.

IMPROVEMENT IN CORN-SHELLERS.

Specification forming part of Letters Patent No. 49,303, dated August 8, 1865.

*To all whom it may concern:*

Be it known that we, J. W. RICKER and T. S. LEWIS, both of Chelsea, in the county of Suffolk and State of Massachusetts, have invented an Improved Corn-Sheller; and we do hereby declare that the following, taken in connection with the drawings which accompany and form part of this specification, is a description of our invention sufficient to enable those skilled in the art to practice it.

This invention relates to the construction of corn-shellers.

In the employment of such machines as have a conductor or spout for guiding the ears of corn to the action of a shelling-disk wheel much difficulty is experienced from the tendency of ears varying in size to obstruct or clog the action of the machine; and one part of this invention consists in the method of loosely hanging or applying the spout, so that the ear is properly presented, whatever may be its size.

Another feature of the invention consists in combining with the teeth of the rotary shelling wheel or disk certain stationary teeth which guide the shelled cob from the impingement or contact of the whole length of disk-teeth, preventing breakage of the cob and insuring contact of the disk-teeth only to the extent necessary to feed the cob out of the machine; and the invention further consists of the employment of a corrugated plate-spring which holds the cob up to the feeding action of the rotary disk by spring-points, instead of by a general bearing of the whole length of the spring upon the cob.

A machine embodying these improvements is shown in the drawings, Figure 1 showing a plan of the same; Fig. 2, a plan with the top plate or cover and conductor removed; Fig. 3, a view showing the interior of the sheller in elevation.

*a* denotes the main rotary shelling or disk wheel, co-operating with an auxiliary rotary wheel, *b*, as in some other machines of this character; *c*, the spout or conductor by which the ears are placed in the machine and carried by the action of gravity down into contact with the teeth of the two wheels *a b*, these teeth catching upon the lower end of the ear before its upper end leaves the spout, said lower end being held in position until the teeth bite upon the ear, so as to carry it forward by a projection, *d*, from the end of the spout. The space between the inner surface or teeth of this projection and the adjacent surface or teeth of the wheel *b* is such as to allow the presentation and passage of the smaller ears of corn and the stripping of the kernels of corn therefrom. Now, if the spout and this projection be fixed or stationary, it will be evident that when a large ear of corn is fed into the machine it will clog between the teeth of the wheel *b* and the inner surface of this projection, obstructing the free action of the machine and causing the cobs to be broken. To obviate this difficulty the plate *e*, to which the spout *c* is applied, is hinged upon the top of the sheller, so that the spout and its projection are free to yield to any inequality in the sizes of the various ears. Thus if a large ear is dropped in, its impingement between the two surfaces of the wheel *b* and the projection *d* causes the spout and projection to swing up, as denoted by red lines in Fig. 3, a weight, *f*, sliding upon an arm or lever, *g*, extending from the plate *e*, serving to regulate the pressure of the projection upon the ear, according as the quality of the corn being shelled may require. The corn, as it is removed from the cob, drops through the spaces in the plate *l*, and thence from the machine, and the cob is carried by the teeth of the disk-wheel (which here move nearly horizontally) endwise along over the surface of this plate *l* and out through a throat made in the end piece of the machine, the cob being held up to the feeding action of these teeth by a spring, *h*, applied to the inner surface of that side of the machine removed in Fig. 3, but seen in Fig. 2, this spring being interposed between the plate *l* and another plate, *i*. Now, if the whole surface or length of the teeth of the disk-wheel take hold of the cob, they are apt to break it into pieces, when it will not readily feed out of the machine. We therefore apply stationary teeth or projections *k* to the under surface of the plate *i*, the teeth pointing in the direction from which the cobs are fed, the points laying close to the flat surface of the disk-wheel. As the ears are shelled and the cobs come under the action of the spring and feed-teeth these stationary teeth bear the cobs away from the surface of the disk, and so that the points of the disk-teeth may only penetrate sufficiently into the surface of the cob to feed it along without breaking it. A slight axially rotative movement is imparted to the cob as it is fed by these teeth by the rotary movement of the disk-teeth, and to facilitate the easy progression of the cob I make the spring $h$ corrugated, or with alternate projections and depressions, so that it only bears in points upon the surface of the ear, instead of having a general longitudinal bearing upon the whole length of the ear, this construction facilitating the rotation of the ear and its progression between the plates and from the machine. This whole arrangement serves to effect the shelling of corn and the separation of the shelled corn from the cobs in a more rapid and satisfactory manner than has ever been heretofore accomplished.

It will be obvious that by the employment of the loosely-hung weighted lever the pressure of the projection from the spout is the same with the weight at a given point upon both small and large ears, while by sliding this weight this pressure can be increased or diminished at pleasure.

We claim—

1. The loosely-hung conductor, with its projection, arranged substantially as set forth, for insuring the proper presentation of the ear without clogging or obstructing the operation of the shelling-wheels; also, combining with the teeth of the disk-wheel for feeding out the cob the stationary guard-teeth, operating in the manner and for the purpose set forth.

2. The corrugated spring for keeping the cob up to the disk without bearing upon its whole length, substantially as described.

3. The weighted lever or arm $g$, in combination with the spout or conductor $c$ and its projection $d$.

In witness whereof we have hereunto set our hands this 8th day of April, A. D. 1865.

JOHN W. RICKER.
TRISTRAM S. LEWIS.

Witnesses:
FRANCIS GOULD,
W. B. GLEASON.